B. EITNER.
BALL BEARING CAGE.
APPLICATION FILED JULY 9, 1909.
980,082.
Patented Dec. 27, 1910.
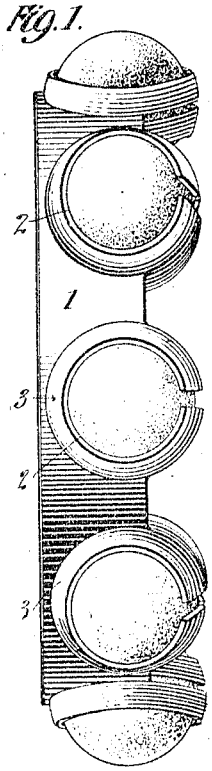
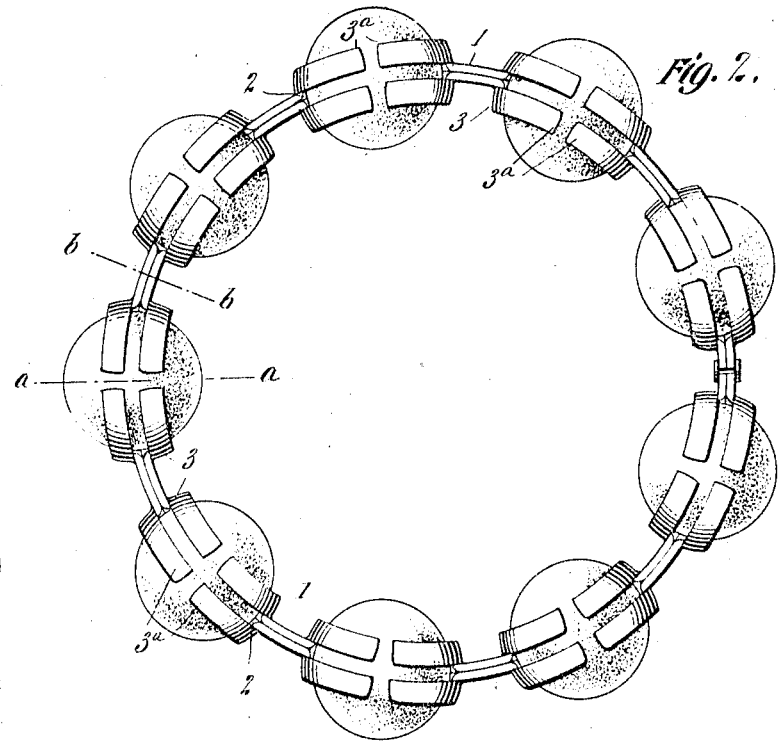
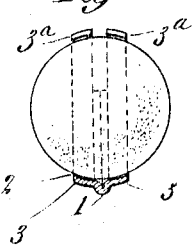
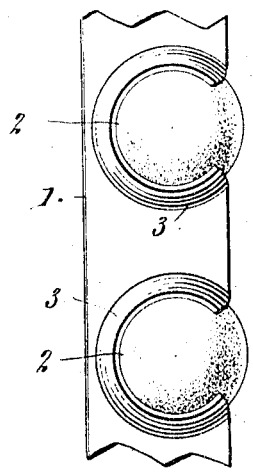
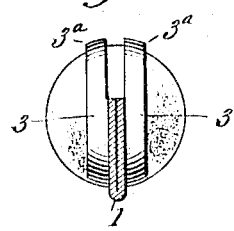
Inventor:
BERTHOLD EITNER,

UNITED STATES PATENT OFFICE.

BERTHOLD EITNER, OF BERLIN, GERMANY.

BALL-BEARING CAGE.

980,082. Specification of Letters Patent. Patented Dec. 27, 1910.

Application filed July 9, 1909. Serial No. 506,761.

To all whom it may concern:

Be it known that I, BERTHOLD EITNER, a subject of the King of Prussia, residing at Berlin, Germany, have invented certain new and useful Improvements in Ball-Bearing Cages, of which the following is a specification, reference being had therein to the accompanying drawing.

This invention relates to ball bearings, and has reference more particularly to the spacing cage usually employed between the casing elements of the bearing to maintain the balls in spaced relations; and the invention consists of a cage or frame for this purpose embodying improved features of construction, having in view lightness and simplicity of construction, economy in production, and effectiveness in operation.

In the accompanying drawings: Figure 1 is a side elevation of my improved cage removed from the bearing and showing the balls held therein; Fig. 2 is a top plan view of the same; Fig. 3 is a vertical cross-section on the line $a, a$, of Fig. 2; and Fig. 4 is a similar view on the line $b, b$, of Fig. 2. Fig. 5 is a view of a modification.

Referring to the drawings: my improved cage consists of a body portion of web 1, containing in one edge a series of curved notches 2, from the edges of which notches, flanges 3 extend outwardly in opposite directions. These flanges follow the curved edges of the notches and are curved in cross-section, as shown more particularly in Fig. 3, and in this manner conjointly form a curved seat for the balls, both transversely and longitudinally. The flanges 3, 3, are continued upwardly beyond the web or body portion of the cage, forming fingers 3ª, which may be bent down on the balls from the opposite sides of each recess, so as to confine the balls therein. I prefer in the formation of a cage possessing these characteristics, to construct the same of a sheet-metal strip folded on itself to present two thicknesses of metal in the body portion, which are connected by the fold at one edge and disconnected at the opposite edge. In this latter edge a series of deep and shallow notches are cut, forming between them projecting portions constituting continuations of the edges of the deep notches. The edges of the deep notches are bent outwardly and form the flanges 3, 3, which when bent downwardly on the balls, as described, form pairs of confining fingers at the sides of the balls. From this construction it will be seen that the seats for the balls are formed conjointly by the flanges on the two sections of the folded body portion, and that the extended portions of these flanges form fingers which confine the balls in their seats.

It will be observed that by reason of the formation of the cage from a strip, it presents little thickness in cross-section, which adapts it to be readily bent into general circular form for assemblage in the bearing. At the same time, by reason of the formation of the ball holding sockets by bending the edges of the strip outwardly, the balls are given extended and effective support by the cage without producing undue or injurious friction.

While in the accompanying drawings I have represented my improved cage in the form I prefer to adopt, I desire to be understood that the invention is not limited to any specific form or arrangement of parts, except in so far as such limitations are specified in the claims.

As shown in Fig. 5 the laterally extending flanges do not project above the edge of the body or strip as they do in the constructions previously described, but terminate at said edge, and after the balls are seated the ends of the flanges are bent down to confine them.

Having thus described my invention, its construction and mode of operation, what I claim and desire to secure by Letters Patent of the United States is as follows:

1. A spacing cage for ball bearings comprising a flat body portion or web provided in its edge with open notches, and having flanges projecting outwardly from the edges of said notches laterally beyond the faces of the web and constituting conjointly ball-holding sockets.

2. A spacing cage for ball bearings comprising a body portion in the form of a flat strip having open notches at intervals in its edge, fingers at the ends of the notches extending beyond the edge of the strip, and flanges projecting outwardly from the sides of the notches and laterally beyond the faces of the web, the said fingers being adapted to be bent downwardly on the balls to confine the same, and the flanges serving as seats for the balls.

3. A spacing cage for ball bearings consisting of a folded body portion presenting two strips or plates disposed face to face and provided at intervals in their edges with open notches, and having flanges extending outwardly from the notched edges of said strips respectively, and laterally beyond the faces of the plates and constituting conjointly ball holding sockets.

In testimony whereof I have affixed my signature in presence of two witnesses.

BERTHOLD EITNER.

Witnesses:
HENRY HASPER,
WOLDEMAR HAUPT.